Patented Apr. 12, 1932

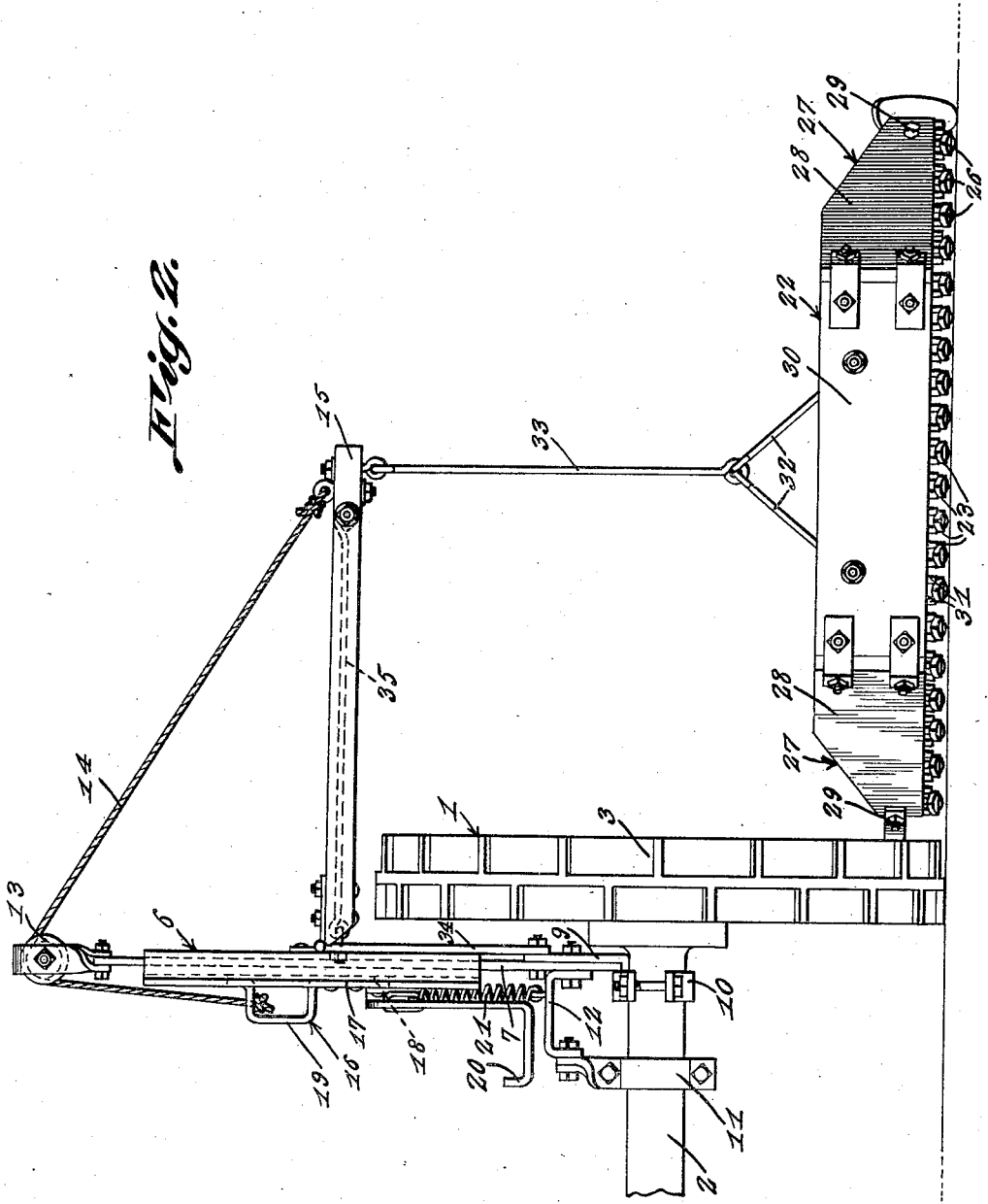

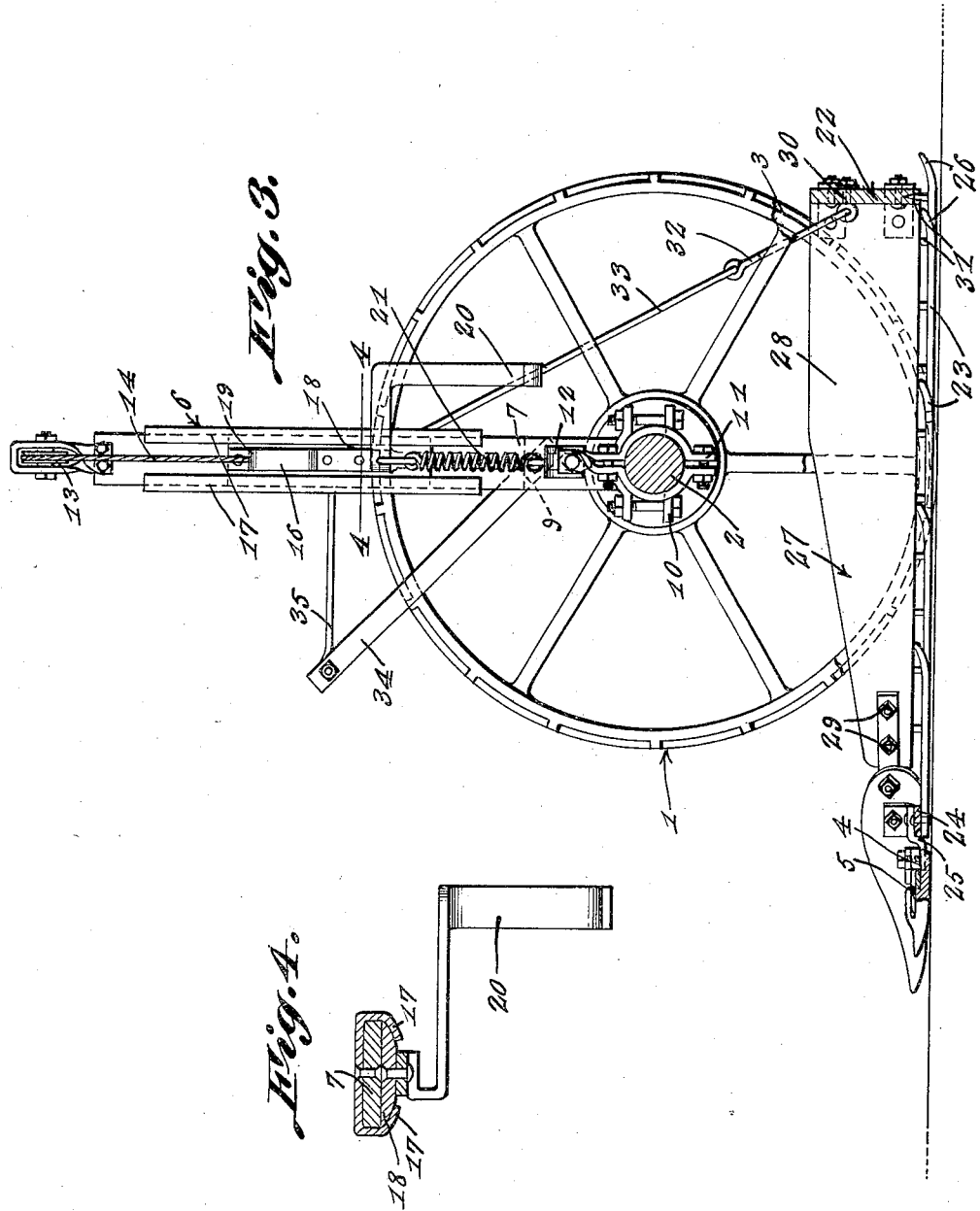

1,854,113

UNITED STATES PATENT OFFICE

LESTER F. DANKENBRING, OF BYRON, NEBRASKA

HAY BUNCHER

Application filed November 1, 1930. Serial No. 492,822.

This invention relates to new and useful improvements in hay bunchers or attachments for mowers to collect hay or the like as cut and has for the primary object, the provision of a device of the above stated character, which may be easily and quickly applied to mowers of different types or makes without altering the construction of the latter or interfering with the operation thereof.

Another object of this invention is the provision of a device of the above stated character which will collect the hay or the like from the cutting mechanism of the mower and dump or deposit the collected hay at the will of the operator, consequently obviating the customary practice of raking the hay after being mowed and further placing the hay in piles or stacks immediately upon being mowed that the hay may be protected from rain or other weather conditions, such as excessive heat from the sun which in many instances causes over-curing or bleaching of the hay rendering the same unsaleable or in improper condition for use as like stock feed.

A further object of this invention is the provision of an attachment for mowers of the above stated character which will be simple, durable, and efficient and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings in which:

Figure 2 is a front elevation illustrating the same.

Figure 3 is a sectional view, illustrating the means for actuating the attachment to deposit the collected hay.

Figure 4 is a detail sectional view taken on the line 4—4 of Figure 3.

Figure 1:
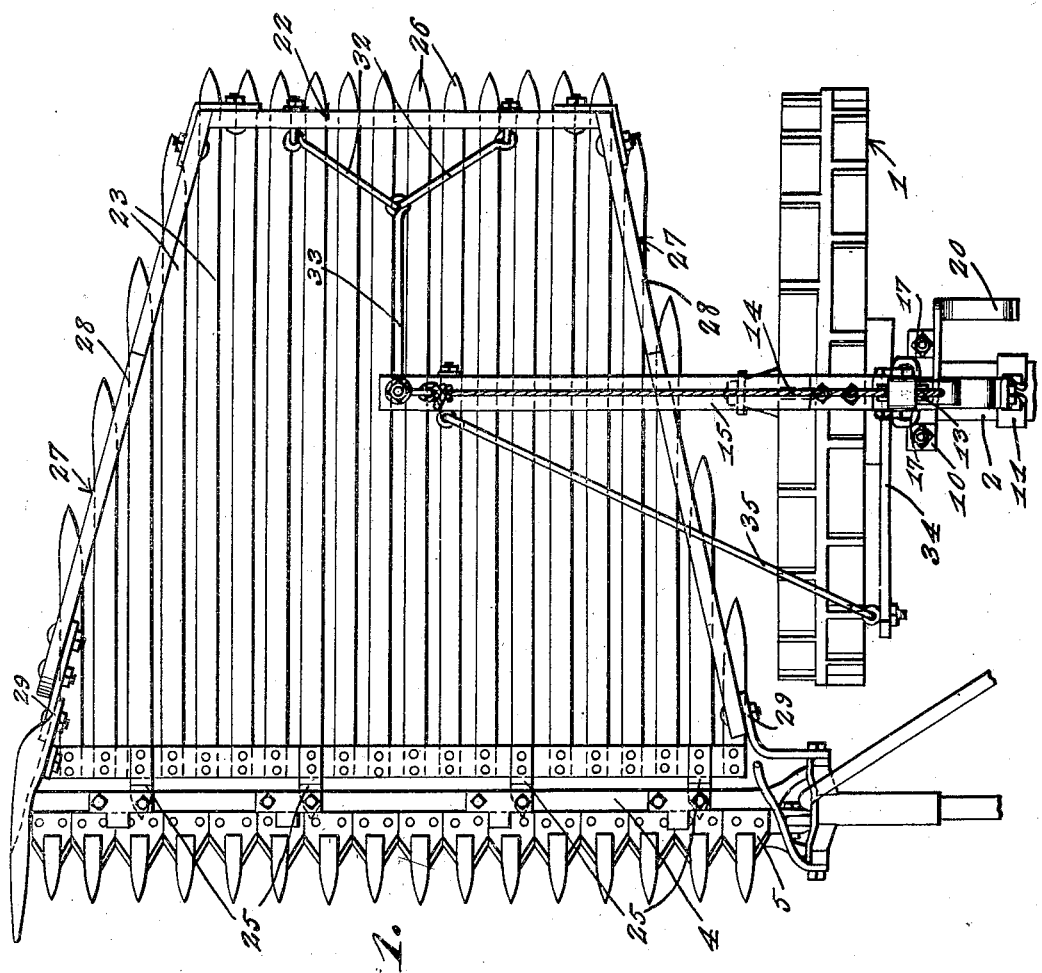
Figure 1 is a top plan view illustrating an attachment constructed in accordance with my invention and applied to a fragmentary portion of a mower.

Referring in detail to the drawings, the numeral 1 indicates the fragmentary portion of a mower of a well known construction and includes the axle 2 and one of the ground or traction wheels 3. The mower 1 carries the usual cutting head 4 laterally of the wheel 3 and has associated therewith a cutting bar 5 operated in a reciprocatory manner in the usual way. The foregoing description relates to a well known type of mower to which my invention or attachment is applied.

A vertical support 6 is disposed over the axle 2 adjacent the wheel 3 and includes a member 7 having its lower end secured to a bracket 9 having an adjustable and detachable clamp 10 engaging about the axle 2. A similar clamp 11 encircles the axle 2 adjacent the clamp 10 and is connected to a substantially U-shaped brace 12 which has one arm portion connected to the clamp 11 while the other arm portion is secured to the member 7 thereby firmly securing the vertical support 6 to the axle. The member 7 carries a sheave 13 over which is trained a flexible element 14 having one end secured to the outer end of a supporting arm or bar 15 and the latter is pivotally connected to the member 7 and extends horizontally while in its normal position from the mower and directly over the wheel 3 thereof. The other end of the flexible element 14 is connected to an operating means 16 slidably mounted on the vertical support 6 and the latter is provided with spaced guides 17 slidably receiving a member 18 constituting a part of the operating means 16. The member 18 is provided with an off-set portion 19 extending outwardly of the guide 17 to which the end of the flexible element 14 is secured and a foot pedal 20 is secured to the member 18 whereby the operator may exert a pressure thereon when desiring to elevate the outer end of the arm 15. A coil spring 21 is attached to the pedal 20 adjacent to its attachment to the member 18 and to the brace 12 for the purpose of aiding the operator in elevating the outer end of the arm 15 and to normally position the parts when the operator's foot is removed from the pedal that they will be so positioned as to remove slack from the flexible element 14.

A hay collector 22 is positioned in rear of the cutting mechanism of the mower and receives the hay or grass as it is cut and includes a plurality of relatively spaced tines or strips 23 which have their forward ends firmly secured to an attaching member 24 and the latter at spaced intervals is detachably secured to the cutter head 4 as shown at 25, while the rear ends of the tines or strips are tapered and directed upwardly as shown at 26 to prevent said ends of the strips or tines from digging into the ground in case the mower is reversed in its motion. The tines or strips follow the cutting mechanism by sliding upon the ground and receive the severed grass or hay and to cause the same to accumulate on the tines or strips a dumping shield or member 27 is provided and includes side members 28 having the forward ends pivotally connected to the cutter head 4 of the mower as shown at 29 while their rear ends are connected by a transverse member 30. The members 28 and 30 cooperate with the tines or strips in forming a collector or receptacle moving in rear of the cutter head 4 when the mower is in use. The members 28 and 30 have depending projections or lugs 31 received between the tines or strips to prevent accidental displacement of the shield 27 while in operation or in the act of accumulating the severed grass or hay on the tines or strips.

Links 32 are connected to the transverse member 30 and in turn are connected to the lower end of an elevating rod 33 which has its upper end pivotally connected to the outer end of the arm 15 so that when the operator elevates the arm 15, the shield 27 will be swung upwardly and the hay or grass accumulated upon the tines will slide off the rear ends thereof by having slight frictional contact with the ground between the tines thereby depositing the collected grass or hay in a pile. After the removal of the collected hay or gass, the operator removes the pressure from the pedal 20 and the shield assumes its normal position on the tines or strips by gravity.

An upwardly and forwardly extending brace arm 34 is carried by the lower portion of the vertical support 6 and has pivotally connected thereto a brace rod 35 which is in turn pivotally connected to the arm 15.

While I have shown and described the preferred embodiment of my invention, it will be understood that minor changes in construction, combination and arrangement of parts may be made without departing from the spirit and scope of the invention as claimed.

Having thus described my invention, what I claim is:

1. A hay buncher comprising a plurality of tines to receive severed grass, a pivoted shield overlying the tines to cause collection of the grass on the tines in pile formation, and means to elevate the shield to permit the collected grass in pile formation to move onto the ground in pile formation during the forward movement thereof.

2. A hay buncher comprising a plurality of tines to receive severed grass and having their free ends tapered and directed upwardly, a pivoted collector overlying the tines to accumulate the severed grass in pile formation, and means for elevating the collector to permit the grass in pile formation to move off of the tines onto the ground during the forward motion thereof.

3. A hay buncher comprising a plurality of relatively spaced tines to receive severed grass, a pivoted collector normally resting upon the tines to accumulate grass in pile formation, projections on the collector and received between the tines, and means for elevating the collector to permit the collected grass to move off the tines onto the ground in pile formation during the forward movement thereof.

4. A hay buncher comprising a plurality of tines to receive severed grass, a pivoted collector resting on the tines, and a manually operated means connected to the collector for elevating the latter at the will of the operator.

5. A hay buncher including a mower having a cutting mechanism and an axle, a collecting means associated with the cutting mechanism, a vertical support detachably secured to the axle, an arm hinged to said support and connected to the collecting means, a sheave carried by the support, a manually operated means carried by the support, and a flexible element trained over the sheave and having one end connected to the free end of the arm and the other end connected to the operating means.

In testimony whereof I affix my signature.

LESTER F. DANKENBRING.